United States Patent [19]

Nomura et al.

[11] Patent Number: 5,030,682

[45] Date of Patent: Jul. 9, 1991

[54] GLASS FIBER REINFORCED POLYOLEFIN RESIN COMPOSITION

[75] Inventors: Manabu Nomura; Hirohide Mizuno; Kaoru Wada, all of Ichihara, Japan

[73] Assignee: Idemitsu Petrochemical Company Limited, Tokyo, Japan

[21] Appl. No.: 387,447

[22] Filed: Jul. 31, 1989

Related U.S. Application Data

[63] Continuation of Ser. No. 153,639, Feb. 5, 1988, abandoned.

[30] Foreign Application Priority Data

Feb. 7, 1987 [JP] Japan .................................. 62-26911
Sep. 30, 1987 [JP] Japan ................................ 62-248685

[51] Int. Cl.$^5$ .......................... B32B 27/32; C08J 3/00; C08L 23/00
[52] U.S. Cl. .................................... 524/522; 428/288; 428/392; 428/391; 428/426; 428/429; 428/441; 428/523; 428/500; 524/500; 524/502; 524/504; 525/78; 525/240
[58] Field of Search ............... 428/375, 378, 391, 392, 428/426, 429, 441, 523, 500, 288; 523/209, 219; 524/584, 586, 522, 556, 502, 504, 500; 525/72, 73, 74, 78, 240

[56] References Cited

U.S. PATENT DOCUMENTS

| | | | |
|---|---|---|---|
| 3,766,135 | 10/1973 | Yamanouchi et al. | 523/209 |
| 3,812,077 | 5/1974 | Hobbs | 523/209 |
| 4,003,874 | 1/1977 | Ide et al. | 524/584 |
| 4,417,019 | 11/1983 | Yamamoto et al. | |
| 4,603,153 | 7/1986 | Sobajima et al. | 523/209 |

FOREIGN PATENT DOCUMENTS

| | | |
|---|---|---|
| 0028085 | 5/1981 | European Pat. Off. |
| 0201996 | 11/1986 | European Pat. Off. |
| 2143831A | 2/1985 | United Kingdom |

*Primary Examiner*—Lorraine T. Kendell
*Attorney, Agent, or Firm*—Armstrong, Nikaido, Marmelstein, Kubovcik & Murray

[57] ABSTRACT

Disclosed is a glass fiber reinforced polyolefin resin composition comprising 15-80% by weight of polypropylene, 20-60% by weight of polybutene-1 and 5-60% by weight of glass fiber. This resin composition is excellent in the balance of impact strength, stiffness, heat distortion temperature, surface hardness and processability. When this composition is molded, the molded products have no surface roughness and no color shade and have good appearance. The properties are further improved when a modified polyolefin alone or together with a crystal nucleating agent are added.

11 Claims, No Drawings

GLASS FIBER REINFORCED POLYOLEFIN RESIN COMPOSITION

This application is a continuation of application Ser. No. 153,639, filed Feb. 5, 1988, now abandoned.

BACKGROUND OF THE INVENTION

(1) Field of the Invention

The present invention relates to a glass fiber reinforced polyolefin resin composition. More particularly, it relates to a glass fiber reinforced polyolefin resin composition which provides molded products substantially free from surface roughness and color shade and having excellent surface appearance and is superior in the balance of impact strength, stiffness, heat distortion temperature, surface hardness and moldability and thus is suitable as molding materials in the automotive fields, home electric appliance fields and other industrial fields.

(2) Description of the Related Art

For example, glass fiber reinforced polyolefin resins such as glass fiber reinforced polypropylene resins (GF-PP) are much superior to conventional polypropylene resins in mechanical properties such as tensile strength, stiffness and heat resistance and are comparable to so-called engineering plastics. Recently, their uses have been extended as materials for industrial parts such as automotive parts and electrical parts.

However, conventional glass fiber reinforced polyolefin resins such as GF-PP have the defects that surface roughness and color shade tend to occur due to orientation of glass fiber, resulting in deterioration of surface appearance of molded products, and thus have limited application to the fields where surface appearance is important such as use in home electric appliances, office automation apparatuses and interior automotive trims.

Hitherto, there have been proposed various methods to improve surface appearance of molded products made from GF-PP and, for example, a composition in which polystyrene and modified polymers are incorporated has been proposed (see Japanese Unexamined Patent Publication (Kokai) No. 58153/75).

However, when this composition is processed into a molded product, surface roughness and color shade is still not satisfactorily removed and further improvement has been desired.

SUMMARY OF THE INVENTION

Accordingly, an object of the present invention is to provide a glass fiber reinforced polyolefin resin composition which provides molded products of good appearance and free from surface roughness and color shade and besides excellent in balance of impact strength, stiffness, heat distortion temperature, surface hardness and moldability.

Another object of the present invention is to provide a glass fiber reinforced polyolefin resin composition which provides molded products of good appearance free from surface roughness and color shade and excellent in the balance of impact strength, stiffness, heat distortion temperature, surface hardness and moldability and besides which does not bring about cohesion of strand cut pellets, namely, superior in production stability and is hardly marred even just after preparation.

As a result of the inventors' intensive research, it has been found that the above objects can be attained by blending polybutene-1 with polypropylene and glass fiber at a specific ratio or by blending polybutene-1 and a specific substance with polypropylene and glass fiber at a specific ratio. The present invention is based on this finding.

The gist of the present invention to accomplish the above objects resides in:

a glass fiber reinforced polyolefin resin composition, characterized by comprising 15–80% by weight of polypropylene, 20–60% by weight of polybutene-1 and 5–60% by weight of glass fiber;

a glass fiber reinforced polyolefin resin composition, characterized by comprising a resin composition comprising 15–80% by weight of polypropylene, 20–60% be weight of polybutene-1 and 5–60% by weight of glass fiber, and not more than 5 parts by weight of modified polyolefin based on 100 parts by weight of said resin composition; and a glass fiber reinforced polyolefin resin composition, characterized by comprising a resin composition comprising 15–80% by weight of polypropylene, 20–50% by weight of polybutene-1 and 5–60% by weight of glass fiber, and not more than 5 parts by weight of modified polyolefin and 0.01–3 parts by weight of a crystal nucleating agent based on 100 parts by weight of said resin composition.

DESCRIPTION OF THE PREFERRED EMBODIMENTS

As said polypropylenes, for example, there may be suitably used polypropylene homopolymers obtained by the conventional processes using so-called Ziegler-Natta catalysts comprising combinations of a nickel compound and an aluminum compound, a titanium compound and an organoaluminum compound and another transition metal compound and an organometallic compound or by other processes, propylene-ethylene random copolymers, mixtures of polypropylene homopolymers and propylene-ethylene random copolymers (e.g., commercially available as so-called propylene-ethylene block copolymers) obtained by multistage polymerization process, and the like. Furthermore, copolymers of propylene, ethylene and olefin of 4–6 carbon atoms may also be included in the polypropylenes used in the present invention.

Among them, especially preferred are those having a melt index (MI) of 5–60 g/10 min and a density of 0.810–0.910 g/cm$^3$ and so-called propylene-ethylene block copolymers and propylene homopolymers having the above melt index and density are preferred.

As the polybutene-1, there may be used any of homopolymers of butene-1 prepared, for example, by vapor phase polymerization, bulk polymerization and slurry polymerization and butene-1 copolymers containing other $\alpha$-olefins in an amount of 30% by weight or less.

Among them, especially preferred are those having an MI of at least 1 g/10 min, preferably 10–25 and a density of at least 0.900 g/cm$^3$, preferably 0.901–0.910.

When MI is less than 1 g/10 min, moldability of the composition of the present invention tends to deteriorate. When density is less than 0.900 g/cm$^3$, improvements of surface roughness and uneven color shade of molded products are sometimes insufficient.

As the glass fiber, there may be optionally used glass fibers conventionally used for reinforcement of resins such as non-alkali glass fibers and low-alkali glass fibers.

Form of the glass fibers is not critical and may be any of roving, chopped strand, strand and the like. However, if the diameter is too large, strength of the composition decreases and appearance may become inferior and if it is too thin, fibers tend to be broken during kneading or molding to cause reduction in strength.

For obtaining compositions having further superior heat resistance and mechanical strength, if necessary, the glass fibers may be surface treated with coupling agents such as of aminosilane type, epoxysilane type, borane type, vinylsilane type and methacrylosilane type, chromium complexing agents and boron compounds.

Among them, especially preferred are glass fibers having a length of 1–8 mm, especially 2–7 mm and a diameter of 20 μm or less, especially 3–15 μm and surface treated with silane coupling agent.

The resin composition of the present invention contains said polypropylene, polybutene-1 and glass fiber at a specific ratio.

Content of the polypropylene is generally 15–80% by weight, preferably 20–70% by weight. When the content is less than 15% by weight, moldability of the resin composition may deteriorate. When more than 80% by weight, stiffness and heat resistance of the resin composition may decrease or effect of improvement in appearance of molded products may not be sufficiently exhibited.

Content of the polybutene-1 is generally 20–60% by weight, preferably 30–50% by weight. When content is less than 20% by weight, effect of improvement in appearance of molded products may not be sufficiently exhibited. When more than 60% by weight, stiffness and heat resistance of the resin composition may decrease markedly.

Content of the glass fiber is generally 5–60% by weight, preferably 10–30% by weight. When content is less than 5% by weight, stiffness and heat resistance of the resin composition may decrease. When more than 60% by weight, moldability of the resin composition may deteriorate.

The glass fiber reinforced polyolefin resin composition of the present invention which contains polypropylene, polybutene-1 and glass fiber at the specific ratio provides good appearance for the molded products made therefrom and besides is superior in the balance of mechanical strengths such as bending strength, Izod impact strength, etc. in such a degree as causing no practical problems and furthermore, is high in heat distortion temperature. In order to further improve mechanical strengths, it is preferred to add not more than 5 parts by weight of a modified polyolefin to 100 parts by weight of resin composition containing 15–80% by weight of said polypropylene, 20–60% by weight of said polybutene-1 and 5–60% by weight of glass fiber.

The modified polyolefins include, for example, polyethylene, polypropylene and ethylene-propylene copolymer which are modified, for example, with unsaturated carboxylic acids, unsaturated carboxylic acid derivatives, chlorine and vinylsilane.

As the unsaturated carboxylic acids used for modification, mention may be made of, for example, acrylic acid, methacrylic acid, maleic acid, fumaric acid, itaconic acid, crotonic acid, citraconic acid, sorbic acid, mesaconic acid and angelic acid. The unsaturated carboxylic acid deriatives include, for example, acid anhydrides, esters, amides, imides and metal salts and as examples thereof, mention may be made of maleic anhydride, itaconic anhydride, citraconic anhydride, methyl acrylate, methyl methacrylate, ethyl acrylate, ethyl methacrylate, butyl acrylate, monomethyl maleate, monoethyl maleate, diethyl maleate, acrylamide, maleic acid monoamide, maleimide, N-butylmaleimide, sodium acrylate and sodium methacrylate.

Among these modified polyolefins, especially preferred are polypropylenes modified with maleic anhydride or acrylic acid.

Process for preparation of modified polyolefins has no special limitation and, for example, there may be employed a process which comprises sufficiently mixing a polyolefin, an unsaturated organic acid or its derivative and an organic peroxide by Henschel mixer and melt kneading the mixture at a temperature higher than the melting point of the polyolefin.

The amount of unsaturated carboxylic acid or its derivative in the thus obtained modified polyolefin is desirably within the range of 0.01–5% by weight. In this case, the amount may be adjusted to 0.01–5% by weight by modifying unmodified polyolefin or by preparing a modified polyolefin containing a large amount of acid and blending an unmodified polyoleifn therewith. Organic peroxides such as benzoyl peroxide, lauroyl peroxide, dicumyl peroxide and t-butyl hydroperoxide are ordinarily used for acceleration of degree of modification and amount thereof is preferably 0.01–3.0 parts by weight per 100 parts by weight of polyolefin.

The content of the modified polyolefin is not more than 5 parts by weight, preferably 0.2–4 parts by weight per 100 parts by weight of the resin composition containing polypropylene, polybutene-1 and glass fiber at the specific ratio as mentioned before. Even when the content exceeds 5 parts by weight, effect of improvement in mechanical strength corresponding to the increment may not be obtained.

In the present invention, in order to obtain a glass fiber reinforced polyolefin resin composition which can provide molded products free from surface roughness and color shade and having good appearance and is superior in balance of impact strength, stiffness, heat distortion temperature, surface hardness and moldability and besides which, for example, brings about no fusion and cohesion of strand cut pellets and thus superior in production stability and is hardly marred even just after molding, it is preferred to add the modified polyolefin in an amount of 5 parts by weight or less and a crystal nucleating agent in an amount of 0.01–3 parts by weight to 100 parts by weight of the resin composition which contains said polypropylene in an amount of 15–80% by weight, said polybutene-1 in an amount of 20–60% by weight and said glass fiber in an amount of 5–60% by weight.

The crystal nucleating agents include, for example, metal salts of organic acid, amine salts of organic acid, sorbitol derivatives, organic phosphorus compounds and inorganic substances.

As said metal salts of organic acid, mention may be made of, for example, sodium salts, calcium salts, aluminum salts and magnesium salts of organic acids such as benzoic acid, p-(tert-butyl)benzoic acid, cyclohexanecarboxylic acid, β-naphthoic acid, cyclopentanecarboxylic acid, succinic acid, diphenylacetic acid, glutaric acid, isonicotinic acid, adipic acid, sebacic acid, phthalic acid, isophthalic acid, benzenesulfonic acid, gluconic acid, caproic acid, isocaproic acid, phenylacetic acid and cinnamic acid. Among them, preferred are aluminum salts of p-(tert-butyl)benzoic acid.

As said amine salts of organic acid, mention may be made of, for example, amines derived from organic acids such as, for example, benzoic acid, phthalic acid and adipic acid.

As said sorbitol derivatives, mention may be made of, for example, 1,3,2,4-dibenzylidenesorbitol, 1,3,2,4-di(methoxybenzylidene)sorbitol and 1,3,2,4-di(ethoxybenzylidene)sorbitol. Among them, dibenzylidenesorbitol is preferred.

As said organic phosphorus compounds, mention may be made of, for example, organic phosphorus compound ($A_1$) represented by the following general formula (A-1) and organic phosphorus compound ($A_2$) represented by the following general formula (A-2):

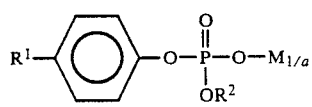

[A-1]

(wherein $R^1$ represents a hydrogen atom or an alkyl group of 1–18 carbon atoms, $R^2$ represents an alkyl group of 1–18 carbon atoms,

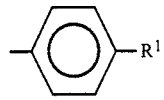

or $M_{1/a}$, M represents K, Mg, Ca or Al and a represents a valence of M).

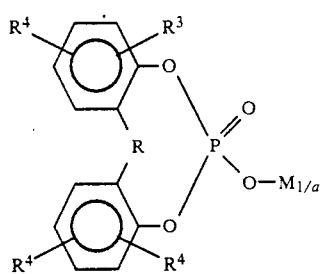

[A-2]

(wherein R represents a methylene group, an ethylidene group, a propylidene group or an isopropylidene group, $R^3$ and $R^4$ each represents a hydrogen atom or an alkyl group of 1–6 carbon atoms and M and a have the same meanings as above).

As said organic phosphorus compound ($A_1$), there may be mentioned various examples depending on $R^1$, $R^2$ and M in the formula (A-1). The following compounds are examples of this organic phosphorus compound ($A_1$).

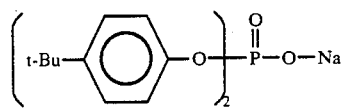

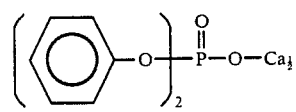

-continued

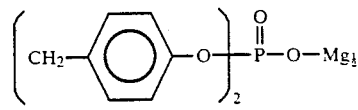

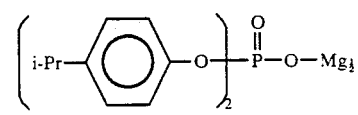

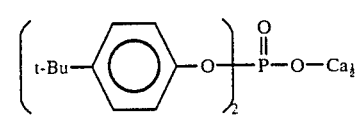

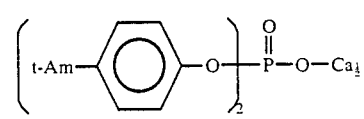

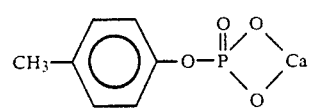

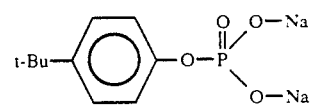

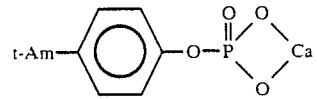

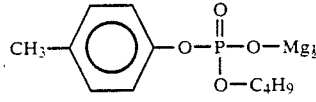

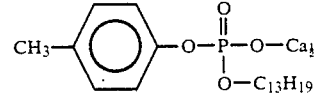

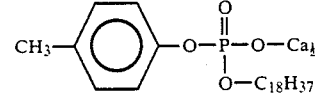

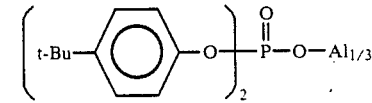

There may be also mentioned various examples for the organic phosphorus compound ($A_2$) depending or R, $R^3$, $R^4$ and M in the formula (A-2). The following are examples of this organic phosphorus compound ($A_2$)/

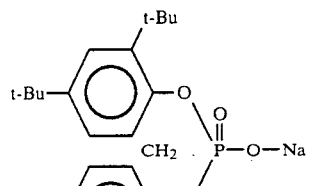
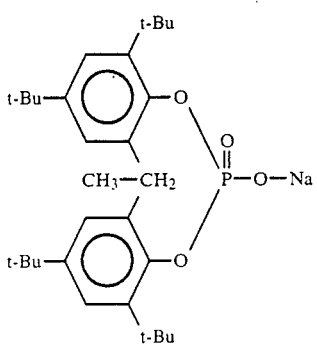
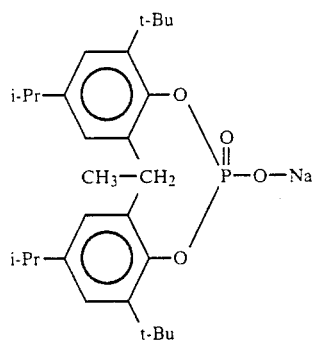
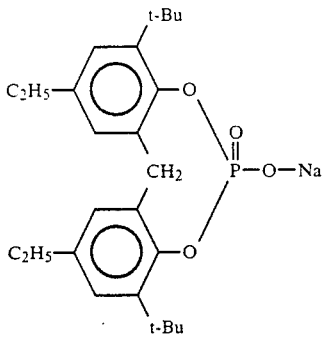
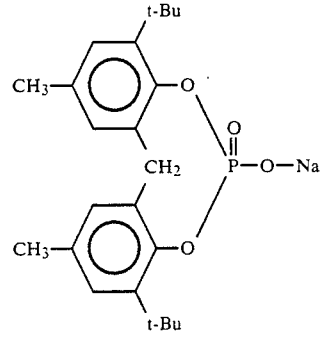
-continued
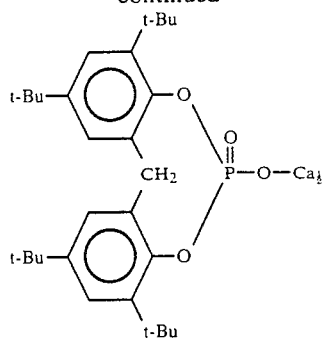
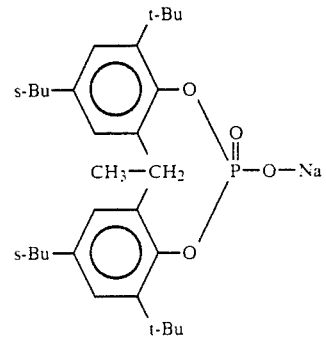
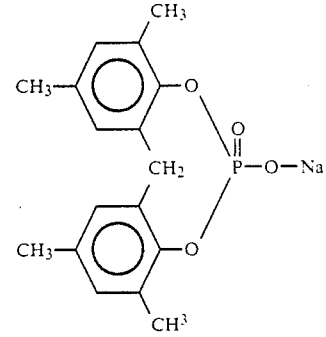
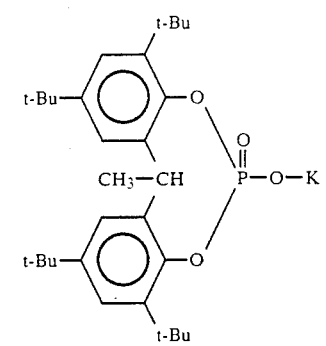
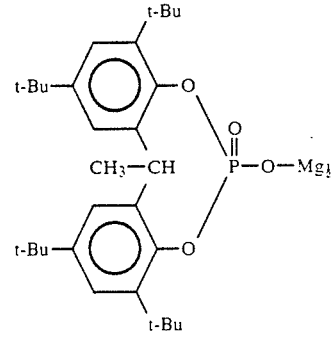

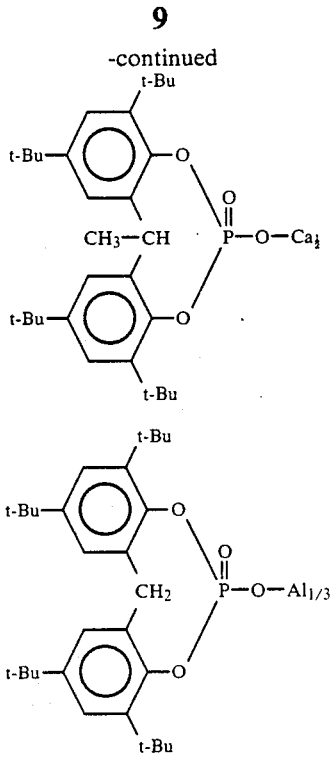

As for the inorganic substances, there are, for example, talc, silica, alum, titanium dioxide, carbon black and various clay minerals. Among them, preferred is talc of 0.5–10 μm and especially preferred is talc of 0.6–3 μm in average particle size.

The content of the crystal nucleating agent is normally 0.01–3 parts by weight, preferably 0.02–1 part by weight for 100 parts by weight of the resin composition comprising polypropylene, polybutene-1 and glass fiber.

When content of the crystal nucleating agent is more than 3 parts by weight, the crystallizing speed becomes too high, resulting in deterioration of surface appearance.

In the present invention, if necessary, additives, elastomers, resins, inorganic fillers and the like may be contained in the composition in addition to the above explained components.

As the additives, mention may be made of, for example, antioxidants such as alkyphenols, amines and quinones; ultraviolet absorbers such as salicylic acid esters; combustion inhibitors such as parrafin chloride, tricresyl phosphate, chlorinated oil, antimony oxide, tetrachlorophthalic acid anhydride, tetrabromophthalic acid anhydride, tetrabromobisphenol A, dibromopropyl phosphate and tri(2,3-dibromopropyl)phosphate; antistatic agents such as aliphatic sulfonehydrochloride, sulfuric acid esters of higher alcohols, sulfuric acid esters of ethylene oxide higher alcohols adducts, phosphoric acid esters of higher alcohols, phosphoric acid esters of ethylene oxide higher alcohol adducts, quaternary ammonium salt type cation active agents, ethylene oxide higher alcohol ethers, fatty acid esters of polyethylene glycol and fatty acid esters of polyhydric alcohols; lubricants such as metal salts of stearic acid and isobutyl stearate; releasing agents such as carnauba wax, paraffin wax, silicone oil, silicone emulsion and silicone spray releasing agents; foaming agents such as azonitrile compounds, benzenesulfohydrazine compounds and diazoamide compounds; and colorants such as carbon black, titanium white, chrome yellow, Oil Yellow, Oil Blue and Oil Red.

As the elastomers, mention may be made of, for example, ethylene propylene rubber, ethylene propylene diene rubber, styrene-butadiene rubber, styrene-butadiene ethylene-styrene rubber, acrylic rubber, epichlorohydrin rubber and butadiene rubber.

As the resins, there may be used, for example, high-pressure low-density polyethylene, straight chain low-density polyethylene, high-density polyethylene and polystyrene.

As the inorganic fillers, mention may be made of, for example, calcium carbonate, talc, mica, carbon black, titanium white, white carbon and slate dust as particulate or sheet-like fillers and magnesium oxysulfate, potassium titanate, calcium silicate, ceramics and carbon fibers as fibrous fillers.

In the present invention, there is no special limitation in the method for mixing of components and there may be used, for example, a method of premixing all of the components and then kneading the mixture and a method of prekneading the resin components and then adding glass fiber thereto. In this case, mixing and kneading can be performed in a conventional manner.

The glass fiber reinforced resin composition of the present invention can be molded, for example, by injection molding, extrusion molding and blow molding.

Since according to the present invention, polybutene-1 together with polypropylene and glass fiber are mixed at a specific ratio, the glass fiber reinforced resin composition can be molded to make products having (1) superior surface smoothness and free from color shade, and (2) in excellent in mechanical properties such as stiffness, impact resistance and heat resistance.

Further, since polypropylene, glass fiber, polybutene-1 and modified polyolefin are mixed at a specific ratio, the glass fiber reinforced resin composition can be molded to products having (1) superior surface smoothness and free from color shade, (2) superior heat resistance, and (3) improved mechanical properties.

Moreover, since polypropylene, glass fiber, polybutene-1, modified polyolefin and crystal nucleating agent are mixed at a specific ratio, the glass fiber reinforced resin composition can be molded to make products having (1) superior surface smoothness and free from color shade, (2) superior heat resistance, (3) improved mechanical properties, and (4) no fusion and cohesion of strand cut pellets, for example, and thus is superior in production stability and besides is hardly marred even just after molding.

Therefore, the glass fiber reinforced polyolefin resin composition of the present invention is suitable for use in molded products for such items as home electric appliances, office automation apparatuses and interior automotive trims where surface appearance is important EXAMPLES 1–21 and COMPARATIVE EXAMPLES 1–5

Modified polyolefin A:

Modified polypropylene having 5% by weight of maleic acid added (IDEMITSU POLYTACK H-1000P)

Preparation of modified polyolefin B

In a 1 liter three-necked separable flask equipped with a stirrer and reflux device were charged 100 parts by weight of polypropylene (MI=8 g/10 min, density=0.90; trade name: Idemitsu Polypro J750H) and 5 parts by weight of hydroxyl-terminated 1,2-polybutadiene (number-average molecular weight=2000; trade name Nisso PBG-2000, manufactured by Nihon Soda Co. Ltd.), 10 parts by weight of acrylic acid, 1.72 part by weight of dicumyl peroxide and 600 parts by weight of xylene and the content was heated in an oil bath by an immersion heater and stirred to carry out reaction at 120° C. over a period of 1 hour and then the reaction was continued for 3 hours at 140° C.

After completion of the reaction, the reaction mixture was cooled, precipitated in a large excess amount of acetone, suction filtered and then dried (at 70° C. for 50 hours) to obtain a white powdered polymer (modified polyolefin B). The amount of acrylic acid in this polymer was 2.0% by weight.

Preparation of resin composition

The component other than glass fiber as shown in Tables 1 and 2 were blended by Henschel mixer. Then, the blend was fed to the hopper opening of a two-shaft kneader by a constant amount feeder and glass fiber was side-fed by a constant amount feeder and they were melt kneaded at 220° C. to obtain pellets containing 0.5 part by weight of carbon black.

The thus obtained pellets were dried at 100° C. for 3 hours and then test pieces and disks of 150 mm in diameter were prepared therefrom by injection molding machine and properties were measured. The results are shown in Table 1.

Re: Method of measurement, evaluation of results of measurement and signs which show the results of evaluation (Surface smoothness)—This was visually evaluated.
"@": There is substantially no surface roughness and the surface is very smooth.
"O": The surface is slightly rough.
"X": The surface is considerably rough.
"XX": The surface is extremely rough.
(Color shade)—This was visually evaluated.
"@": No color shade.
"O": Substantially no color shade.
"X": Considerable color shade.
"XX": Conspicuous color shade.
(Blending strength)—This was measured in accordance with JIS K7203.
(Izod impact strength)—This was measured in accordance with JIS K7110.
(Heat distortion temperature)—This was measured in accordance with JIS K7207.

(Surface hardness just after molding)

The composition was injection molded under the conditions of injection molding temperature of 230° C. and mold temperature of 50° C. to make test pieces of 75 cm×75 cm×3 cm and surface hardness thereof after 1 minute was measured.

(Fusion and cohesion property of pellets at preparation)

The composition was extruded by TEM-70 (two-shaft kneader) under the conditions of resin temperature of 220° C. and extrusion amount of 250 kg/hr and then passed through a cooling water bath. Then, strands were cut by a pelletizer to obtain pellets. Among the pellets, two or more pellets which cohered to each other were taken out and percentage thereof in the whole pellets was measured.
"O": Less than 3%
"Δ": 3–10%
"X": more than 10%

Resin components and signs therefor in Table 1

PP-1: Mixture of propylene homopolymer and propylene-ethylene copolymer obtained by two-stage polymerization; trade name:
"Idemitsu Polypropylene J3050H", MI=30 g/10 min, ethylene content: 6% by weight.
PP-2: Mixture of propylene homopolymer and propylene-ethylene copolymer produced by two-stage polymerization; trade name:
"Idemitsu Polypropylene J78 5H"; MI=8 g/10 min; ethylene content: 5% by weight.
PP-3: Mixture of propylene homopolymer and propylene-ethylene copolymer produced by two-stage polymerization; trade name: "Idemitsu Polypropylene J45 0H"; MI=4 g/10 min; ethylene content: 6% by weight.
PP-4: Propylene homopolymer; MI=8 g/10 min.
PP-5: Propylene homopolymer; trade name: "Idemitsu Polypropylene J2000G"; MI=20 g/10 min.
PB-1: Polybutene-1; MI=16 g/10 min.
PB-2: Polybutene-1; MI=2 g/10 min.
Glass fiber A: Non-alkali glass fiber of length: 3 mm and diameter: 13 μm and surface treated with aminosilane.
Glass fiber B: Non-alkali glass fiber of length: 3 mm and diameter: 9 μm and surface treated with aminosilane.
Glass fiber C: Non-alkali glass fiber of length: 3 mm and diameter: 6 μm and surface treated with aminosilane.
Crystal nucleating agent a: Aluminum p-t-butylbenzoate
Crystal nucleating agent b: Bis(4-t-butylphenyl) sodium phosphate (trade name: "NA-10" of Adeca-Argus Co.)
Crystal nucleating agent c: Methylene bis(2,4-di-t-butylphenol) acid phosphate sodium (trade name: "NA-11" of Adeca-Argus Co.)
Crystal nucleating agent D: Talc; average particle size: 0.8 μm.
Crystal nucleating agent e: 1,3,2,4-Dibenzylidene sorbitol

TABLE 1

| | Polypropylene | | Polybutene-1 | | Glass fiber | | Modified polyolefin | |
|---|---|---|---|---|---|---|---|---|
| | Kind | Part by weight | Kind | Part by weight | Kind | Part by weight | Kind | Part by weight |
| Example 1 | PP-1 | 35 | PB-1 | 35 | A | 30 | — | — |
| Example 2 | PP-2 | 50 | PB-1 | 40 | C | 10 | — | — |
| Example 3 | PP-3 | 30 | PB-2 | 30 | B | 40 | — | — |

TABLE 1-continued

| | | | | | | | | |
|---|---|---|---|---|---|---|---|---|
| Example 4 | PP-4 | 40 | PB-1 | 40 | A | 20 | — | — |
| Comparative Example 1 | PP-1 | 70 | — | — | A | 30 | — | — |
| Example 5 | PP-1 | 50 | PB-1 | 20 | A | 30 | A | 1 |
| Example 6 | PP-1 | 50 | PB-1 | 30 | A | 20 | A | 1 |
| Example 7 | PP-1 | 50 | PB-1 | 40 | A | 10 | A | 0.5 |
| Example 8 | PP-1 | 35 | PB-1 | 35 | A | 30 | A | 1 |
| Example 9 | PP-1 | 20 | PB-1 | 50 | A | 30 | A | 2 |
| Comparative Example 2 | PP-1 | 70 | — | — | A | 30 | A | 1 |
| Comparative Example 3 | PP-1 | 60 | PB-1 | 10 | A | 30 | A | 1 |
| Comparative Example 4 | PP-1 | 5 | PB-1 | 65 | A | 30 | A | 1 |
| Example 10 | PP-2 | 50 | PB-1 | 40 | C | 10 | A | 1 |
| Example 11 | PP-3 | 30 | PB-2 | 30 | B | 40 | A | 1 |
| Example 12 | PP-4 | 40 | PB-1 | 40 | A | 20 | B | 3 |
| Example 13 | PP-4 | 50 | PB-1 | 30 | A | 20 | A | 1 |

| | Results of test | | | | |
|---|---|---|---|---|---|
| | Appearance | | Bending strength kg/cm$^2$ | Izod impact strength kg. cm/cm | Heat distortion temp. °C. |
| | Surface smoothness | Color shade | | | |
| Example 1 | ⊚ | ⊚ | 628 | 14.0 | 124 |
| Example 2 | ⊚ | ⊚ | 473 | 13.2 | 116 |
| Example 3 | ⊚ | ⊚ | 870 | 14.5 | 145 |
| Example 4 | ⊚ | ⊚ | 728 | 13.8 | 120 |
| Comparative Example 1 | XX | XX | 680 | 6.8 | 132 |
| Example 5 | ○ | ○ | 1100 | 15.8 | 141 |
| Example 6 | ○ | ○ | 846 | 14.4 | 140 |
| Example 7 | ⊚ | ⊚ | 533 | 10.7 | 123 |
| Example 8 | ⊚ | ⊚ | 937 | 16.5 | 135 |
| Example 9 | ⊚ | ⊚ | 716 | 26.4 | 121 |
| Comparative Example 2 | XX | XX | 1180 | 13.0 | 151 |
| Comparative Example 3 | X | X | 1020 | 13.3 | 146 |
| Comparative Example 4 | ⊚ | ⊚ | 274 | 20.7 | 81 |
| Example 10 | ⊚ | ⊚ | 511 | 12.8 | 121 |
| Example 11 | ⊚ | ⊚ | 1080 | 17.2 | 152 |
| Example 12 | ⊚ | ⊚ | 880 | 12.8 | 142 |
| Example 13 | ⊚ | ⊚ | 934 | 12.1 | 147 |

TABLE 2

| | Polypropylene | | Polybutene-1 | | Glass fiber | | Modified Polyolefin | |
|---|---|---|---|---|---|---|---|---|
| | Kind | Part by weight | Kind | Part by weight | Kind | Part by weight | Kind | Part by weight |
| Example 14 | PP-1 | 35 | PB-1 | 35 | A | 30 | A | 1 |
| Example 15 | PP-1 | 35 | PB-1 | 35 | A | 30 | A | 1 |
| Example 16 | PP-1 | 35 | PB-1 | 35 | A | 30 | A | 1 |
| Comparative Example 5 | PP-1 | 35 | PB-1 | 35 | A | 30 | A | 1 |
| Example 17 | PP-1 | 50 | PB-1 | 30 | A | 20 | B | 1 |
| Example 18 | PP-1 | 20 | PB-1 | 50 | A | 30 | A | 2 |
| Example 19 | PP-2 | 50 | PB-1 | 40 | C | 10 | A | 1 |
| Example 20 | PP-3 | 30 | PB-2 | 30 | B | 40 | A | 1 |
| Example 21 | PP-5 | 40 | PB-1 | 30 | A | 30 | A | 1 |

| | Results of test | | | | | |
|---|---|---|---|---|---|---|
| | Appearance | | Surface hardness just after molding | Cohesion of pellets at preparation | Bending strength (kg/cm$^2$) | Heat distortion temperature (°C.) |
| | Surface smoothness | Color shade | | | | |
| Example 14 | ⊚ | ⊚ | 91 | ○ | 1010 | 140 |
| Example 15 | ⊚ | ⊚ | 92 | ○ | 1034 | 141 |
| Example 16 | ⊚ | ⊚ | 87 | ○ | 988 | 139 |
| Comparative Example 5 | X | X | 102 | ○ | 1098 | 143 |
| Example 17 | ⊚ | ⊚ | 95 | ○ | 951 | 146 |
| Example 18 | ○ | ○ | 87 | ○ | 841 | 130 |
| Example 19 | ⊚ | ⊚ | 85 | ○ | 602 | 125 |
| Example 20 | ○ | ○ | 94 | ○ | 1145 | 155 |

TABLE 2-continued

| Example 21 | ⊚ | ⊚ | 104 | ○ | 1210 | 151 |

It can be seen from Table 1 that polybutene-1 is essential for attaining the object of the present invention and besides, when amount of the polybutene-1 is outside the range specified in the present invention, the object of the present invention cannot be attained.

Furthermore, the glass fiber reinforced resin composition containing modified polyolefin is further superior in surface appearance and mechanical properties.

The glass fiber reinforced resin composition set forth in Table 2 contain a crystal nucleating agent not only have superior appearance mechanical properties and heat resistance, but also are improved in hardness just after molding and hardly cause cohesion of pellets due to fusion thereof at preparation. When amount of the crystal nucleating agent is outside the range specified in the present invention, the object of the present invention cannot be attained.

What is claimed is:

1. A glass fiber reinforced polyolefin resin composition consisting essentially of:
   15–80% by weight of polypropylene-1 having a melt index of 0.810–0.910 g/cm$^3$;
   20–60% by weight of polybutene-1 having a melt index of 1–25 g/10 min and a density of at least 0.900 g/cm$^3$;
   5–60% by weight of glass fiber;
   0–5 parts by weight of polyolefin modified with an unsaturated carboxylic acid or unsaturated carboxylic acid derivative per 100 parts by weight of the resin composition; and
   0.01–3 parts by weight of a crystal nucleating agent per 100 parts weight of the resin composition.

2. A glass fiber reinforced polyolefin resin composition according to claim 1 wherein the polybutene-1 has a melt index of 10–25 g/10 min and a density of 0.901–0.910 g/cm$^3$.

3. A glass fiber reinforced polyolefin resin composition according to claim 1 wherein the glass fiber is non-alkali glass fiber.

4. A glass fiber reinforced polyolefin resin composition according to claim 1 wherein the glass fiber has a fiber length of 1–8 mm and a diameter of 20 μm or less.

5. A glass fiber reinforced polyolefin resin composition according to claim 1 wherein the glass fiber has a fiber length of 2–7 mm and a diameter of 3–15 μm.

6. A glass fiber reinforced polyolefin resin composition according to claim 1 wherein the glass fiber is surface treated with a silane coupling agent.

7. A glass fiber reinforced polyolefin resin composition according to claim 1 wherein the content of the modified polyolefin is 0.2–4 parts by weight per 100 parts by weight of the resin composition.

8. A glass fiber reinforced polyolefin resin composition according to claim 1 wherein the modified polyolefin is a polypropylene modified with maleic acid or acrylic acid.

9. A glass fiber reinforced polyolefin resin composition according to claim 8, wherein the modified polyolefin is modified with 0.01–5% by weight of maleic acid or acrylic acid.

10. A glass fiber reinforced polyolefin resin composition according to claim 1 wherein the crystal nucleating agent is at least one member selected from the group consisting of a metal salt of organic acid, an organic phosphorus compound represented by the formula (A-1):

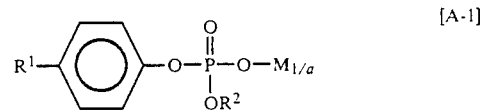

wherein R$^1$ represents a hydrogen atom or an alkyl group of 1–18 carbon atoms, R$^2$ represents an alkyl group of 1–18 carbon atoms,

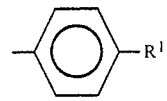

or M$_{1/a}$, M represents a potassium atom, a magnesium atom or an aluminum atom and a represents a valence of M, an organic phosphorus compound represented by the formula (A-2):

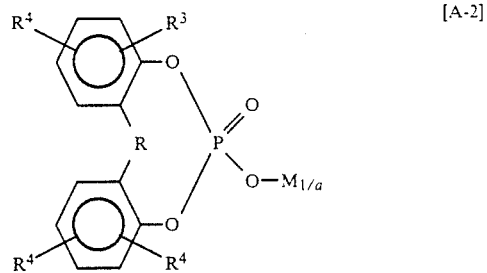

wherein R represents a methylene group, ethylidene group, propylidene group or isopropylidene group, R$^3$ and R$^4$ each represents a hydrogen atom or an alkyl group of 1–6 carbon atoms and M and a have the same meanings as above, a sorbitol derivative and an inorganic substance.

11. A glass fiber reinforced polyolefin resin composition according to claim 1 wherein the crystal nucleating agent is selected from the group consisting of aluminum p-t-butylbenzoate, bis(4-t-butylphenyl) sodium phosphate, methylene bis(2,4-di-t-butylphenol) acid phosphate sodium, 1,3,2,4-benzylidenesorbitol and talc.

* * * * *